C. W. MYERS.
TRACTOR.
APPLICATION FILED JUNE 28, 1920.

1,378,892.

Patented May 24, 1921.
2 SHEETS—SHEET 1.

INVENTOR
CHARLES W. MYERS
BY
Edward R. Inman
ATTORNEY

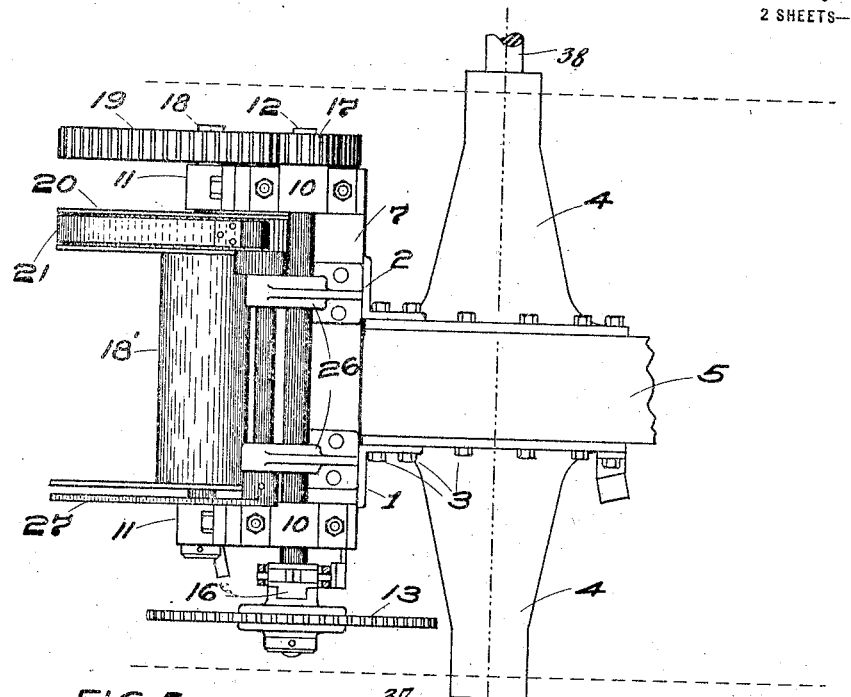
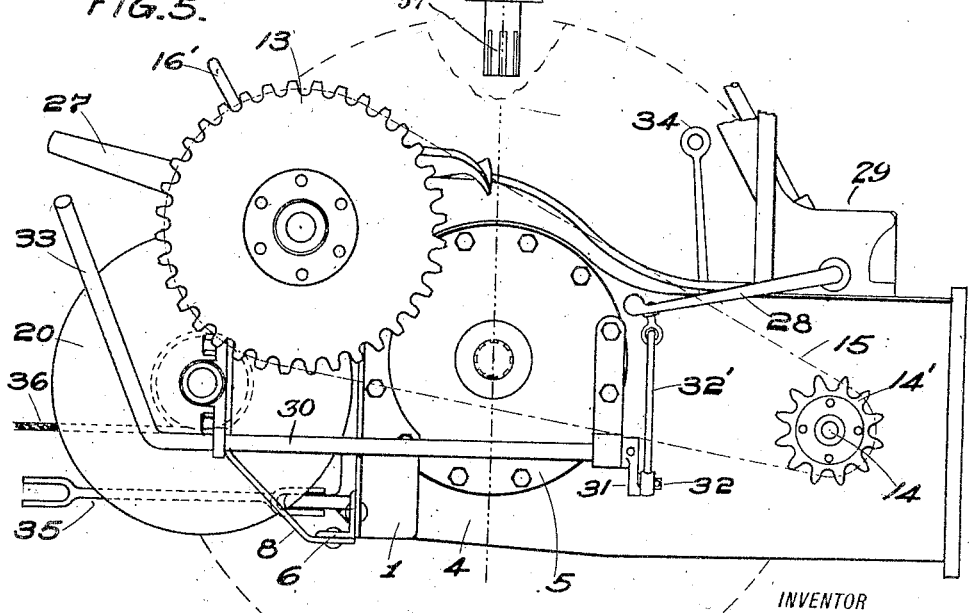

UNITED STATES PATENT OFFICE.

CHARLES W. MYERS, OF FRANKLIN, PENNSYLVANIA.

TRACTOR.

1,378,892.  Specification of Letters Patent.  Patented May 24, 1921.

Application filed June 28, 1920. Serial No. 392,358.

*To all whom it may concern:*

Be it known that I, CHARLES W. MYERS, citizen of the United States, residing at Franklin, in the county of Venango and State of Pennsylvania, have invented certain new and useful Improvements in Tractors, of which the following is a specification.

The objects, construction and operation of my improved tractor are herein set forth with sufficient clearness to enable those skilled in the arts to which its construction and use respectively relate, to make and use the same.

The primary object of this invention is to increase the efficiency and field of utility of a farm tractor, in the way of providing it with a supplementary pulling power which is approximately double the normal draw bar pulling power of the tractor and which may be temporarily employed when the tractor and its load for any reason become stalled, and the draw-bar power is not sufficient to do the required work. Another object is to provide a tractor with a convenient and efficient pulling or hoisting equipment, suitable for use wherever hoisting or hauling by means of a cable or any other flexible line, is to be done.

The construction of my improved tractor will be fully understood from the following specification, reference being had to the accompanying drawings, in which I have shown my improvement applied to a well-known make of tractor.

The various figures of the drawings are as follows:

Fig. 5 is a plan view of my improvement showing a portion of the transmission housing and the axle housing of the tractor to which my improvement is here shown as applied.

Fig. 6 is a side elevation of my improvement, together with said transmission and axle housings, of the tractor to which it is applied.

Figure 1:
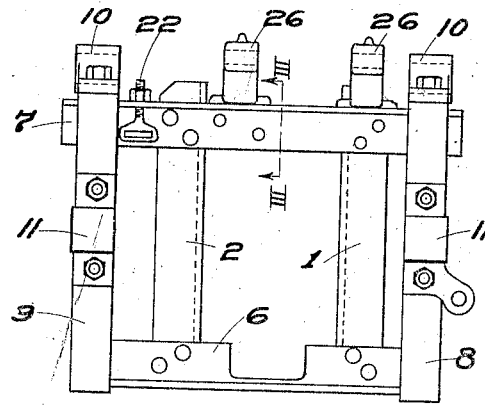
Figure 1 is a rear elevation of the form of frame or mounting structure whereby my improvement is applied to the tractor shown.
Figures 2, 3:
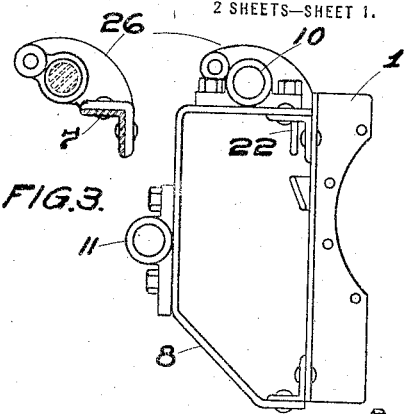
Fig. 2 is a side elevation of same.
Fig. 3 is a section at line III—III of Fig. 1.
Figure 4:
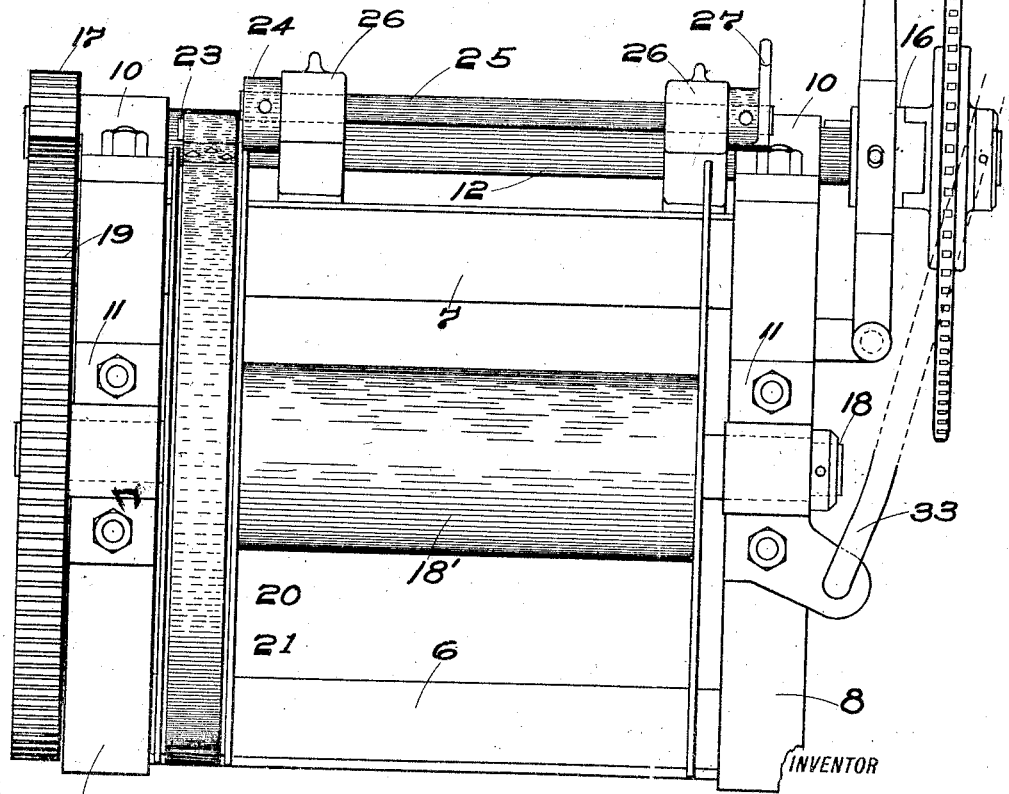
Fig. 4 is an enlarged rear elevation of my improvement.

The construction here illustrated is substantially as follows:

The frame-work shown,—especially in Figs. 1, 2 and 3, comprises the following elements:

Two brackets 1, 2, which are preferably structural steel angles, are provided. One leg each of said angles is adapted to be removably attached to the rearward portion of the transmission housing of the tractor by means of a portion of the bolts 3, which serve to attach the axle housings 4, 4, to said transmission housing 5. Said brackets 1 and 2 are vertically disposed. Two transversely or horizontally disposed steel angles 6 and 7, are attached to said brackets 1 and 2,—one adjacent to the lower end and the other adjacent to the upper end thereof. To said angles 6 and 7 two bearing supports or frames 8 and 9 are attached, each of which is provided with two shaft-bearings 10, 10 and 11, 11. The bearings 10, 10 carry a revoluble pinion shaft 12, upon one end of which is mounted a suitable receiving member, as a pulley or sprocket 13 to which power is transmitted from the belt-pulley shaft 14 of the tractor. A belt or chain, as selection may determine,—indicated by the dotted line 15 in Fig. 6,—is employed to transmit power from said pulley shaft 14 to said pinion shaft 12 and the thereto rigidly secured pinion 17. Any suitable means such as a clutch 16 may be used to render said transmission active or inactive at the will of the operator; said pinion 17 is keyed to the opposite end of said shaft 12.

A drum-shaft 18 is revolubly mounted in the bearings 11, 11, and to one end of this shaft is operably secured a gear 19, in mesh with pinion 17. A winding or cable-drum 18' is rigidly secured to said shaft 18 whereby said drum is revolved. One end of said drum is equipped with a friction brake comprising a friction drum 20 and a friction band 21 passing around said drum 20, one end of which band is attached to the adjustable eye 22, carried by the angle 7. The other end of said band is attached to an actuating pin 23 of a crank 24 that is secured to the shaft 25; said shaft 25 is mounted in suitable bearings 26, 26, secured to said angle 7; a brake lever 27 is applied to said shaft 25 which for convenience of accessibility and manipulation is placed in proximity to the operator's position, as will presently be pointed out more fully.

The tractor here shown is provided regularly with a clutch-pedal 28 that is operable to engage and disengage the clutch of the transmission gearing. Inasmuch as the operator, when operating my improvement, does not occupy the seat 29 (occupied when the tractor is drawing a load at the draw-bar) it is necessary to supply an actuating device which will be in convenient proximity to the operator's position when operating my improvement. For this purpose I provide an extension clutch actuating device comprising the shaft 30, to the forward end of which is attached a crank 31, provided with a crank-pin 32 from which a reach-rod 32' extends to said clutch-pedal 28 and is operably connected thereto. The rearward end of said shaft 30 is formed into an actuating lever 33 which is conveniently located in relation to the operator's position. It will thus be noted that all of the levers which control the various functions of my attachment are located at or adjacent to the rearward right-hand end of the machine,—this being the operator's position, from which all the necessary actuation and control may be accomplished with ease and despatch.

The draw-bar of the tractor is indicated in Fig. 6 by the reference ordinal 35 and the drum line by the ordinal 36, and by an inspection of this figure, it will be noted that they occupy very nearly the same horizontal plane, thus providing a ready substitution the one for the other.

The pulley shaft 14 is geared direct to the motor by means of a pair of intermeshing miter gears.

The automotive power transmission for the rear or propelling wheels, is positioned between said shaft 14 and the axle shafts 37 and 38 of said wheels, hence this gearing which includes the change-speed gears and a reverse gear does not enter into, or form a part of the gearing which transmits power from the motor to the winding drum; neither does the differential gear, which is carried by said axle shafts 37 and 38. The matter of thus relieving the automotive transmission of the tractor from the severe strains which would otherwise be put upon it, is one of the valuable features of my invention.

The operation of my equipment will now be described, and as a requisite to a full understanding of its operation and its practical utility, the fact should be kept in mind that the power delivered at the draw-bar of a tractor of any make is, in nearly all cases, fifty per cent. of that delivered at the pulley, hence twice as much power may be derived from the pulley as may be derived from or exerted by the draw-bar.

In addition to this characteristic of all tractors of the class specified, it will readily be noted that, on account of the relative diameters of sprockets 14' and 13, and of the pinion 17 and gear 19, through which pulley power is transmitted to said drum 18', the power exertible by said drum is greatly augmented, as compared to that exertible at the pulley—that is, in this case, at the sprocket 14'.

In respect to this point of the derivation or delivery of power from the pulley shaft, and from the draw-bar of a tractor, I have, both for convenience of reference thereto in the specification and for certainty of distinction and differentiation in the appended claims referred to the former as "pulley power" and to the latter as "draw-bar power," since a proper consideration of my invention, as well as the object, utility and efficiency thereof, depend upon a proper regard for the variation of power as delivered from these to elements whereby the power of the tractor motor is made available.

In the operation of a tractor, as when it is drawing a load at the draw-bar, it often occurs that the load, for various reasons, may temporarily exceed the pulling power of the tractor; as for instance, the tractor and its load may become mired or stuck in the mud; a brushy piece of land may have to be plowed in which the roots of the turf are so tough and tenacious that the power required to turn the soil exceeds the normally available draw-bar power. In such a case the draw-bar 35 of the tractor is disconnected from its load and the tractor is run on ahead to a suitable distance (several hundred feet if desired) and suitably anchored. The cable which is carried by the drum 18' is then attached to the load and it is drawn up to the tractor. In case one operation of this kind does not extricate the load from its difficult position or conditions, it may be repeated as often as required. It will be readily seen that this provision greatly increases the range of utility and the efficiency of the tractor and is a great saving means as to wear and tear upon the machine as compared to what would result from an endeavor to maneuver the tractor in the regular way through work, conditions and strains beyond its normal capacity.

By taking several turns of the rope or cable around the drum, it may be used as a winch, thus avoiding the matter of the drum becoming larger as the cable is wound thereon and the consequent decrease of available power due thereto.

Many other uses of my improvement could be enumerated: only one other use will, however, be described for the purpose of explaining more fully the operation of my construction. For the purpose of pulling oil-wells my attachment has been found convenient, economical and efficient. When this work is to be done, the tractor is located in proximity to the well: the cable is then run through a sheave or pulley at the bottom of the derrick, then over a pulley in the top of the derrick, then down to the well, and, by a suitable hitch or connection into the rods or tubing (as by means of the usual elevators) said tubing and rods may be readily pulled from the well. In performing this work the operator takes a position at the rear right-hand side of the machine and by means of the clutch-lever 33, engages the transmission clutch—(clutch 16 being engaged)—and this actuates or revolves the winding drum to wind the cable 36 thereon and hoist the load to which it is attached. When it is desired to stop the hoisting operation,—as for example to unscrew the joints of the rods or tubing—lever 33 is actuated so as to disengage the transmission clutch and upon this disengagement, the brake lever 27 is actuated to set the drum brake and hold the load as desired; also by disengaging clutch 16 the load may be lowered by means of the drum brake.

The drum equipment here shown has been found to be an efficient, economical and convenient appliance for operating a baler in baling oil and gas wells.

In the drawings, only a sufficient portion of a well-known tractor is shown to illustrate the application of my improvement thereto, but I do not wish to be understood as confining the application of my improvement to any particular type of tractor, although the construction of some of them is such that my improvement is much more readily adapted to them than to others.

The construction of many tractors is such that my improvement may be readily applied thereto, and the arrangement of the automotive organization of these tractors is admirably adapted to receive and coöperate with said improvement. By the term "automotive organization" is meant, the motor, the propelling wheels, and such transmissive elements or combinations of elements as may be employed to transmit driving power from said motor to said wheels. In addition to this automotive organization, nearly all farm tractors include a belt-pulley shaft, from which the power for driving my drum is derived. In some tractors this belt-pulley shaft is the crank-shaft of the engine and as an illustration of such construction reference is made to the illustrations on pages 36 and 37 of the 1918 edition of a publication entitled "*Case Machinery*" published by J. I. Case Threshing Machine Co. of Racine, Wis.

In other tractors the belt pulley shaft is a separate shaft that is positioned adjacent to the engine and between the same and the "transmission" which comprises the change speed and the reverse gears. An example of this construction is clearly illustrated upon pages 48 and 50 of the 8th edition of a publication entitled *Fordson Tractor Manual* published by the Ford Motor Company, of Highland Park, Michigan.

In either construction above designated the transmission gearing is not employed in driving the drum 18'.

I claim the following:

1. In a tractor of the farm type having an automotive organization which includes a motor, propelling wheels, transmission gearing, also a differential gear, transmitting power from said motor to said wheels, a winding drum carried by the housing of the differential gear of said gearing, and gearing other than said transmission gearing, arranged to transmit power from the motor to said drum.

2. In a tractor of the farm type having an automotive organization which includes a motor, propelling wheels, transmission gearing which comprises a differential gear transmitting power from said motor to said wheels, also a belt-pulley shaft driven by said motor; a winding drum carried by the housing of said differential gear, driving gearing other than the automotive transmission gearing arranged to transmit power from said belt-pulley shaft to said drum, means rendering said driving gearing operative or inoperative at will, and a brake for said drum arranged to control the reverse action thereof.

3. In a tractor of the farm type having an automotive organization which includes a motor, propelling wheels, transmission gearing which includes a differential gear transmitting power from said motor to said wheels, also a belt-pulley shaft driven by said motor; an organization coöperating with the foregoing comprising, in combination, a drum shaft revolubly carried by the housing of said differential gear, a winding drum operably carried by said drum-shaft, speed-reducing, driving gearing transmitting power from said belt-pulley shaft to said drum-shaft, and means rendering said driving gearing operative or inoperative at will.

4. In a tractor of the farm type having an automotive organization which includes a motor, propelling wheels, transmission gearing transmitting power from said motor to said wheels, a carrying structure for said organization, also a belt-pulley shaft driven by said motor; an organization coöperating with the foregoing and comprising in combination, a drum-shaft revolubly carried by said carrying structure and positioned rearwardly of said wheels, a winding-drum fixed to said drum-shaft, a brake-member carried by said drum, a gear keyed to said shaft, a pinion shaft revolubly carried by said structure, a pinion keyed to said pinion shaft in mesh with said gear, a transmission member revolubly carried by said pinion shaft, clutch mechanism adapted to operably engage said transmission member with said pinion-shaft, a transmission member carried by said belt-pulley shaft, means operably connecting said transmission members, and means coöperating with said brake member so as to control the reverse motion of said drum upon the disengagement of said clutch mechanism.

In testimony whereof I affix my signature in presence of two witnesses.

CHARLES W. MYERS.

Witnesses:
M. R. HENDERSON,
KATHARINE Y. READ.